United States Patent [19]

Heller et al.

[11] 4,096,573
[45] Jun. 20, 1978

[54] DLAT SYNONYM CONTROL MEANS FOR COMMON PORTIONS OF ALL ADDRESS SPACES

[75] Inventors: Andrew Robert Heller, Mohegan Lake, N.Y.; Richard Lee Sites, San Diego, Calif.

[73] Assignee: International Business Machines Corporation, Armonk, N.Y.

[21] Appl. No.: 790,731

[22] Filed: Apr. 25, 1977

[51] Int. Cl.$^2$ ............................................. G06F 13/00
[52] U.S. Cl. ................................................. 364/200
[58] Field of Search ... 364/200 MS File, 900 MS File

[56] References Cited

U.S. PATENT DOCUMENTS

| | | | |
|---|---|---|---|
| 3,725,874 | 4/1973 | Van Heel | 364/200 |
| 3,781,808 | 12/1973 | Ahearn | 364/200 |
| 3,902,163 | 8/1975 | Amdahl | 364/200 |

Primary Examiner—James D. Thomas
Attorney, Agent, or Firm—Bernard M. Goldman

[57] ABSTRACT

The embodiment relates to special controls in a processor to prevent synonym entries in a translation lookaside buffer (DLAT) for a system which has DLAT entries that can concurrently translate virtual page addresses in multiple address spaces into real main storage page frame addresses. The controls use a synonym resolution register (SRR) which divides each address space in the system into common and private portions. Fields in the SRR indicate which portions are to be common to all address spaces, and which portions are private in each address space. A SRR control circuit selects a particular status field under control of a virtual address requesting main storage access. Each DLAT entry contains a common/private storage indicator which is controlled by the particular status field when the DLAT entry is loaded. When the DLAT entry is read, the private/common storage indicator controls whether the DLAT entry can only be used privately by the address space identified in the DLAT, or commonly by all address spaces.

10 Claims, 10 Drawing Figures

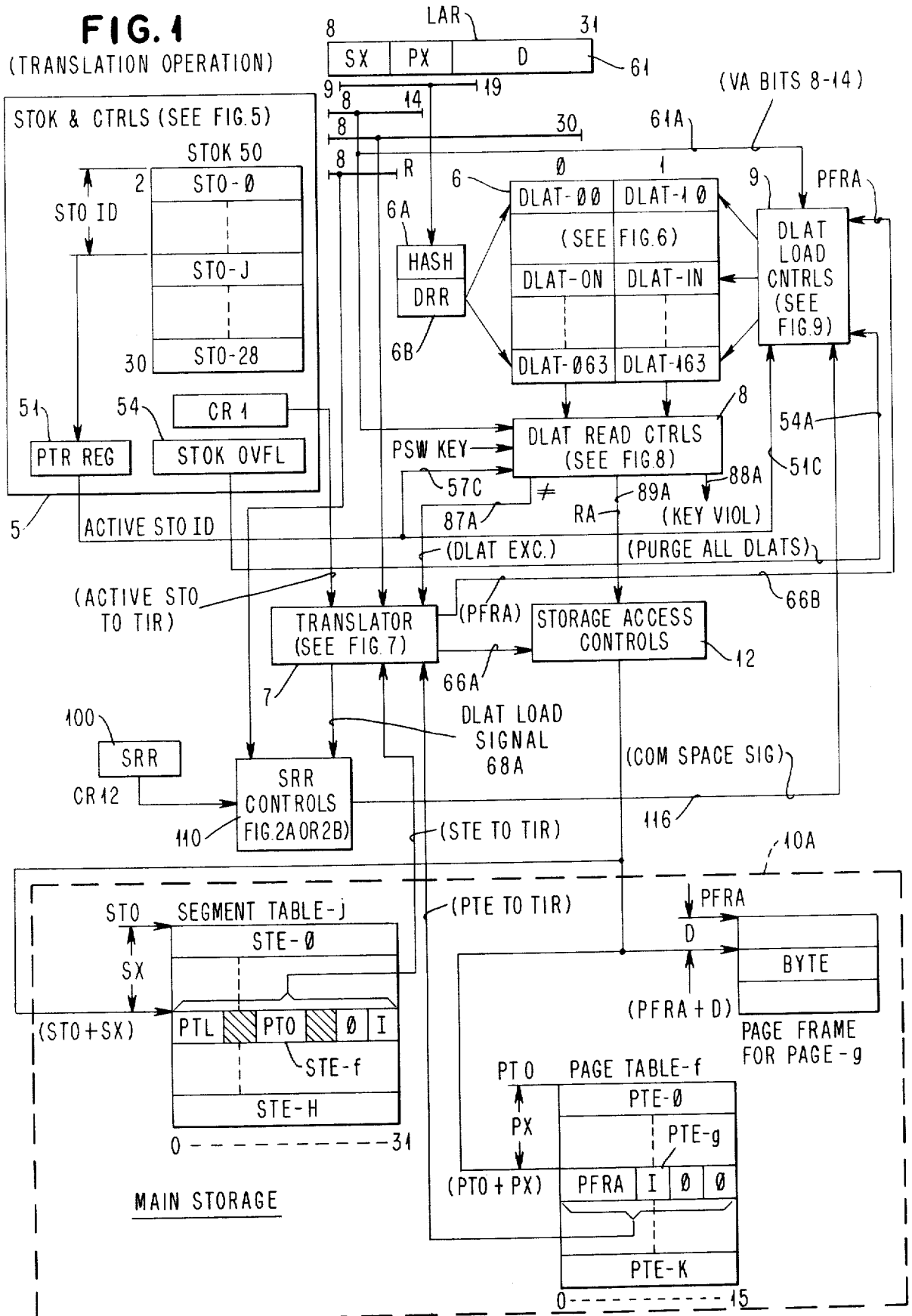
FIG. 1 (TRANSLATION OPERATION)

(DLAT READ CONTROLS)

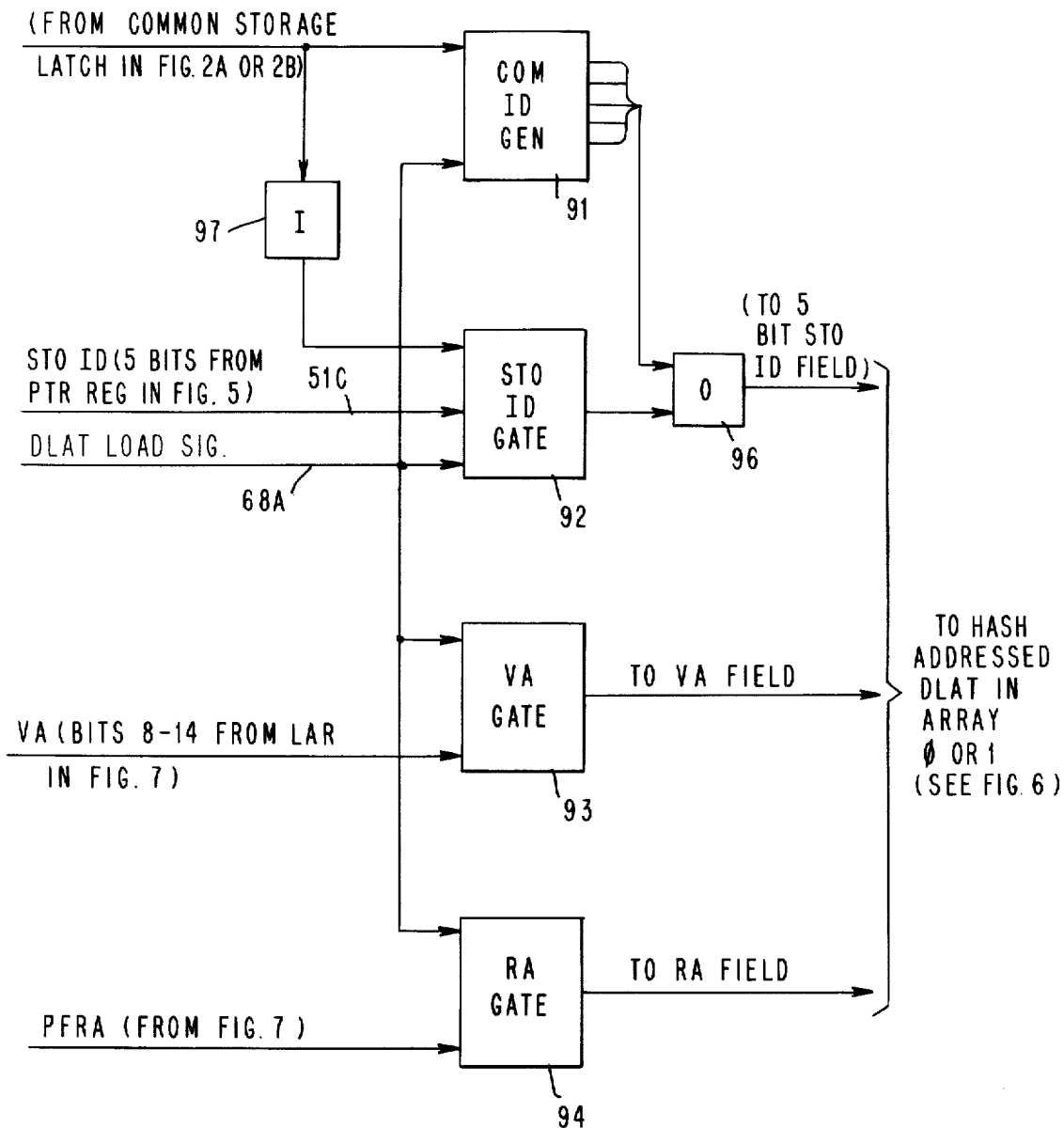

DLAT SYNONYM CONTROL MEANS FOR COMMON PORTIONS OF ALL ADDRESS SPACES

INTRODUCTION

This invention relates generally to the elimination of synonym entries in a translation lookaside buffer (DLAT) used in high performance data processing systems which can simultaneously translate virtual addresses for multiple address spaces into real main storage addresses, wherein the different address spaces must have access to the same set of shared programs and data. A DLAT synonym is a DLAT entry which translates the same virtual address for accessing a page containing data or programs, that are also translated in another DLAT entry for the same information in another page for another address space. The subject invention is an alternative to the invention disclosed and claimed in IBM Docket PO9-76-021, filed Mar. 24, 1977 by P. M. Gannon et al, and assigned to the assignee of this invention.

PRIOR ART

DLAT synonyms are found in prior systems which have dynamic lookaside address translation (DLAT) buffers. DLATs have been used for many years to increase the speed of accessing translated addresses in main storage, or in a high speed buffer (i.e. cache). Examples of DLAT prior art which fail to prevent DLAT synonyms are U.S. Pat. No. 3,725,874 to Van Heel, U.S. Pat. No. 3,781,808 to T. P. Ahearn et al, and U.S. Pat. No. 3,902,163 to Amdahl et al.

In systems supporting multiple address spaces, each user may be assigned a different address space; and for security reasons, no access is permitted from one private address space to another. Since the services of operating system programs (e.g. IBM OS/VS2 Release 2 MVS) are needed by all programs in all address spaces, the solution has previously been to assign those common programs and data to one or more segments in each of the address spaces. Whenever a user operating in his own address space required access to the common programs, he merely addressed the programs within his own address space. This separate manner of addressing has had an adverse affect on system performance because the common programs and data are translated by different DLAT entries in the processor. For example, if two users concurrently needed the same OS program, that program is paged into main storage and translated for that user's address space. If another user desires the same program, it will not be paged into main storage again for the other user, however, it will be independently translated for that user's address space. The penalty for the translation for each address space resulted in a needless overhead in translation and in a waste of DLAT entries through the duplication of translations in DLAT entries (i.e. DLAT synonyms) for the various users concurrently requiring the same shared programs and data.

SUMMARY OF THE INVENTION

It is a primary object of this invention to eliminate wasteful duplication in the use of main storage for corresponding variably selectable size portions in all address pages which can be easily controlled to contain programs and data common to all address spaces, such as system control programs and data. The address space portions not made common are private to each address space.

It is another object of this invention to eliminate the concurrent assignment of plural DLAT entries to the same page assigned in common to programs and/or data shared by all address spaces.

It is a further object of this invention to improve processor efficiency in the use of a limited number of DLAT entries in the processor by eliminating page duplication in the DLAT.

It is another object of this invention to minimize the thrashing, and resultant system overhead, in the reassignment of the limited number of DLAT entries in a processor by eliminating synonym clashes in the use of those DLATs due to many of them containing DLAT synonyms, wherein it then becomes necessary for the system to repeatedly swap out DLAT entries to make room for synonym DLAT entries, and then swap in the entries for execution as referenced.

It is a further object of this invention to eliminate the waste of system time caused by DLAT synonyms by permitting one DLAT entry to be used by plural address spaces concurrently requiring access to a common page.

It is still a further object of this invention to provide hardward which supports the shareability among all user address spaces of common address space portions in which the size of the portions are selected by the number of high-order bits gated from a logical address register to a synonym resolution register (SRR), and the SRR as a mask field for each portion in any single address space.

It is another object of this invention to provide a synonym resolution register having mask field positions which respectively indicate the common/private state for each respective portion in every address space in the system.

It is still another object of this invention to locate the SRR in a system control register, in which the mask field positions are set to an initialized state by loading the system control register.

It is a further object of this invention to provide DLAT synonym control by controlling the setting of an indicator in each DLAT entry for indicating whether the DLAT entry is to be shareable by all user address spaces or is to be restricted to a single address space identified in the DLAT entry.

It is another object of this invention to provide DLAT read controls which recognize whether an address space indicator within each DLAT entry is signalling that access should be restricted to the identified address space, or that the access should be permitted by ignoring the address space identification in the case of shared access. The capability of effectively eliminating address space identification in any DLAT entry allows shareability of the page addressed by the respective DLAT entry among all address spaces; while recognition of the address space indicator in the DLAT entry requires the DLAT entry to be used privately only by the identified address space.

The invention is used in the environment of a processor which can provide concurrent addressability in its DLAT for the most recently used pages in plural address space. The DLAT addressability for plural address spaces is conventionally obtained by providing an address space identifier field in each DLAT entry, which uniquely represents a required page in that address space by associating the page with the page frame real address (PFRA) in the same DLAT entry to provide the address translation for that page. Future accesses to data in the translated page addressed by a DLAT entry can be done quickly by using the DLAT entry to access the data in main storage, or in a cache, without having to take the time to retranslate the virtual address. U.S. Pat. No. 3,781,808 to Ahearn et al describes and claims hardware which supports these operations, as used in the IBM S/370 Model 168 CPU.

An embodiment of the invention provides a synonym resolution register (SRR) which contains a plurality of status fields that correspond to portions of the address space in each address space in the system. Each of these fields is called a portion status field. In the preferred embodiment a single bit is used for each portion status field. The status field controls the setting of common storage indicators in DLAT entries. The common storage indicator is set when a DLAT entry is loaded during translation of a requesting virtual address not available in an existing DLAT entry. As long as the entry remains valid in the DLAT, it indicates whether or not the page translated in the DLAT entry is accessible by all address spaces in the system, or whether that translated page only is accessible privately by the address space identified in the DLAT entry.

A portion status field is selected in the SRR for controlling the loading of each DLAT entry. SRR control circuits use a high order part of the requesting virtual address to select the required status field in the SRR during the translation process. The state of the status field signals DLAT load controls how it will set a common storage indicator in the DLAT entry receiving the results of the translation. The setting of the common storage indicator is then set to indicate whether the page translated in the DLAT entry is to be shared or private. If the common storage indicator is set to common status in the DLAT entry, the translated page in the DLAT entry is available to any address space. If the common storage indicator is not set to common status in the DLAT entry, the translated page is private, and an identifier in the DLAT entry is set by the load controls to identify the only address space which can use that DLAT entry.

In order to obtain a DLAT entry for readout or loading, hash addressing of a requesting virtual address is first used to select a pair of associative DLAT entries. The hashing must not include hash bits from the address space identifier, as has been done in prior art DLAT hash addressing such as in U.S. Pat. No. 3,781,808 (previously referenced). Such prior hash addressing would make the invention inoperable, because it would prevent the same virtual address in different address spaces from always selecting the same common page. Therefore, the invention obtains hash bits only from the virtual address without using the address space identifier.

DLAT read controls conventionally sense the address space indicator in each DLAT entry being read. In this invention, the DLAT controls must also sense the common storage indication in any DLAT being read. In the invention, when the read controls sense a common storage indication in a DLAT entry (for which no other conditions are violated), the DLAT read controls ignore the address space identification from the requesting address space and allow access to the DLAT translated page by transferring the page frame real address (PFRA) from the DLAT entry to the main storage access controls which perform the access in main store or the cache. If the common storage indicator is not set, the address space identifier of the requesting address space must compare equal to the address space identifier in the DLAT entry to obtain access.

The SRR is divided into $2^n$ number of space portion fields, which respectively correspond to $2^n$ number of equal size address space portions in each address space, in which each portion has $2^{24-n}$ bytes on $2^{24-n}$ byte address boundaries in the address space ($2^{31-n}$ in 31 bit addressed machines), in which $n$ is the number of high-order bits in a virtual address register decoded to locate a required portion field in the SRR. The portion fields in the SRR respectively contain flag settings indicating the common and private status of the address space portions. The portions can have a byte size which is any power of 2 with the page size as a lower limit, and the address space size as an upper limit.

The invention thereby obtains novel loading and DLAT entry selectivity (1) to permit all address spaces to use a DLAT entry translation by avoiding a comparison with the address space indicator field in the DLAT entry, or (2) to obtain private address space security by rejecting requests for a DLAT translation from any address space which does not have its address space indicator compare equal with the DLAT contained address space indicator.

Each address space is represented in the system by a segment table, which is defined to the processor by a segment table origin (STO). Each STO is a real address for locating the beginning of a segment table in main storage. There may be a very large number of STO's useable in the system. When any STO is to be used, it is made active by being put into a control register (CR), and it is also put into a next entry in a segment table origin stack (STOK).

An address space indicator is provided for each STO in the STOK as an index to the STOK, called a STO ID. The STO's each occupy 32 bits (full word) in each STOK entry, and in the CR. A STO cannot be located in more than one entry in STOK. The reason for having the STOK is to minimize the number of bits needed for the address space indication in the DLATs, in order to reduce the DLAT size. Smaller DLATs are generally faster operating than larger DLATs. For example, a STOK containing up to 29 STO's requires only five bits for a STO ID to identify an address space, and replaces having to use all 32 bits of the STO. Whenever a STO is removed from the STOK, all DLAT entries using that STO as a private indicator must be invalidated, either by selective invalidation or by having all DLAT entries reset.

BRIEF DESCRIPTION OF THE DRAWINGS

FIG. 1 illustrates a block diagram of a general embodiment of the invention.

FIG. 9 shows in detail the DLAT load control used in the embodiment.

DESCRIPTION OF THE PREFERRED EMBODIMENT

Figure 2A:
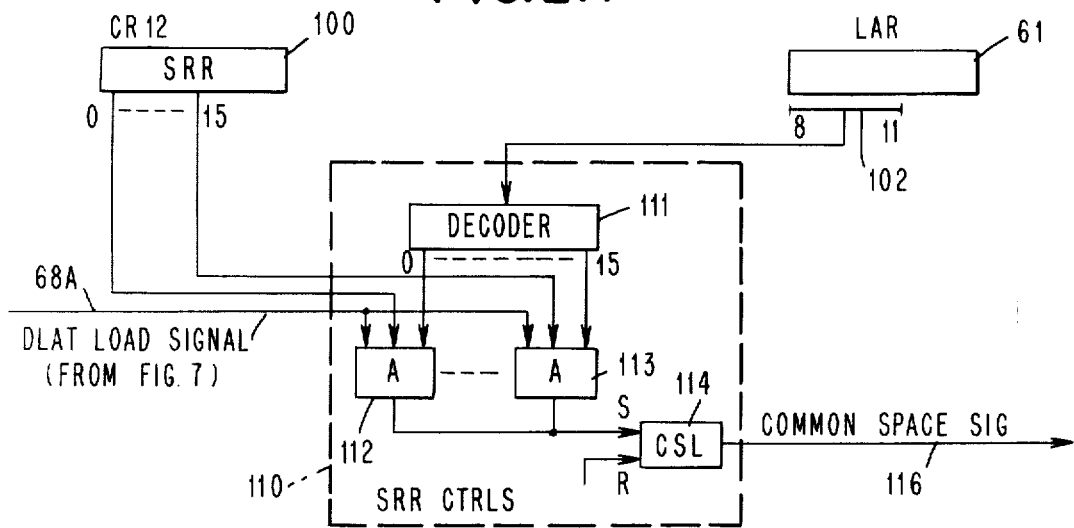
FIGS. 2A and 2B provide different embodiments of SRR controls.

FIG. 1 illustrates a block diagram of the preferred embodiment in a machine having up to 29 active STO IDs. A STOK and controls 5 has a control register (CR 1) which contains the active segment table origin (STO) which identifies to the processor the address space for the virtual address in a logical address register (LAR) 61, which is currently requesting the address to be accessed. Controls 5 also contain a segment table origin stack (STOK) 50 which has entries which sequentially receive each active STO when it is loaded into CR1. The address spaces represented by the STO's in STOK are the only address spaces which are represented currently by the entries in DLAT 6. The 29 entries in the STOK have index values of 2 through 30. These index values are used as STO identifiers (STO ID). The currently active STO in CR1 is also in STOK and is located by the STO ID in a pointer register (PTR REG) 51. Only STO IDs 2 through 30 are used to identify private address spaces in the DLAT, and the STO ID values 0, 1 and 31 are used in the DLAT to indicate the special conditions of invalid DLAT, no-dynamic address translation (NON-DAT mode), and common storage respectively. Therefore, the 31 value is used by this invention to provide the common storage indication that a DLAT entry translates a page shareable by all address spaces. A larger STOK with more STO IDs could be provided, for example, by having a six bit STO ID support 61 STOK entries ($2^6 - 3$), etc.

In FIG. 1, box 54 signals an overflow condition for STOK 50, when all entries 2 through 30 are filled and another STO is to be entered into the STOK. Circuit 54 generates the overflow signal when STO ID 30 is in PTR REG 51 and a next active STO in CR1 is not found by a search of STOK entries 2 through 30. The overflow output signal from circuit 54 is transferred to DLAT load circuits 9 to reset all DLAT entries.

DLAT 6 is structured like the DLAT found in IBM System/370 M168 CPU. DLAT 6 in FIG. 1 is two-way set associative, in which half of the DLAT array is designated DLAT table 0 having 64 entries designated as 00 through 063, and the other half of the DLAT array is designated as DLAT table 1 containing 64 entries designated as 10 through 163. DRR register 6B contains the address of the currently selected pair of DLAT entries. The address in DRR 6B is derived by hash circuits 6A hashing bits 9 through 20 of the virtual address in LAR 61.

Figure 6:
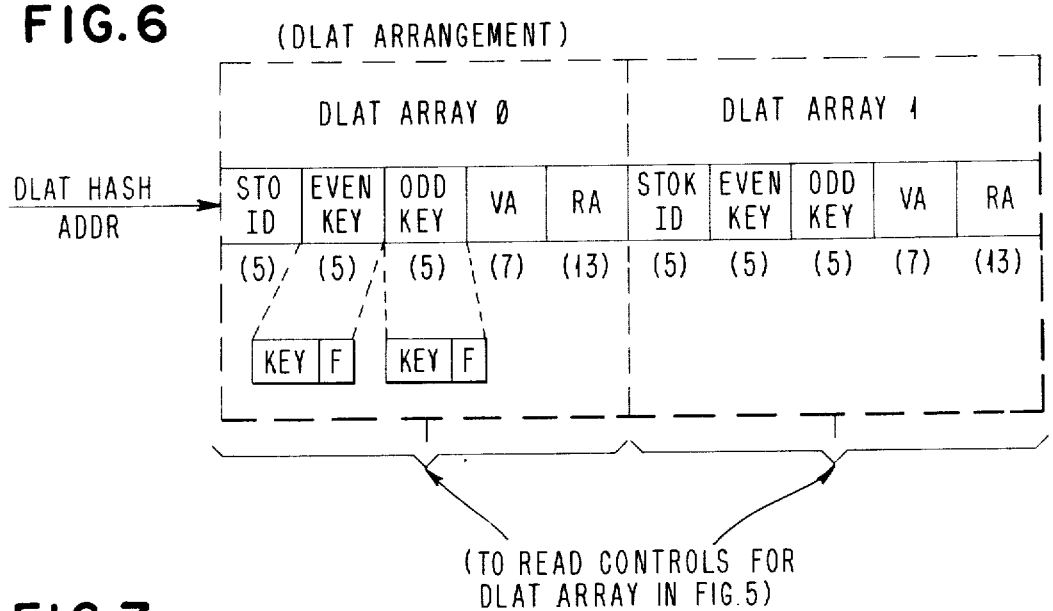
FIG. 6 illustrates the format for each pair of associated DLAT entries accessed by a single DLAT hashed address.

FIG. 6 illustrates the format for the pair of selected entries being addressed by the DRR register. It is seen therein that each entry contains a STO ID field. The STO ID field is loaded with either (1) a private STO ID from pointer register 51, or (2) the common STO ID value 31 because of a common space status field being selected from the synonym resolution register (SRR) 100 in FIG. 1 while loading a DLAT entry. For loading the DLAT, the address translation proceeds in the conventional manner using the selected segment table and page table in FIG. 1, which may be identical to those used in the IBM OS/VS2 Release 3.7 system control programs known as MVS (Multiple Storage Systems) with an IBM S/370 M168 data processing system.

During the conventional translation of the virtual address in LAR 61 by a translator 7, the SX component of the address locates the required STE entry from the beginning of the segment table located by the current STO, wherein the STE address is STO plus SX. The page table origin (PTO) address in the accessed STE is used by the translator to address the beginning of a page table having the required page table entry (PTE), shown as PTE-g in FIG. 1. The PTE-g address is PTO plus PX. The real or absolute address of the page to be accessed is contained in the PFRA component of the accessed PTE, which is then transferred by translator 7 to DLAT load controls 9 and put into the absolute address (RA) field in the selected DLAT.

When an address space portion status field in the SRR is set to 1, it indicates a common (i.e. shared) accessability to that portion of address space corresponding to the status field. However, when a status field is set to 0, it indicates that the corresponding portion in each address space is private to that address space.

In FIG. 6, the virtual address (VA) field in the selected DLAT entry also receives bits 8–14 from the VA in LAR 61 in order to distinguish the VA for the page in the selected DLAT from the VA's for the pages in the other DLAT entries, in which the hashed address always is part of the distinguishing characteristic for the virtual addresses represented in the DLAT. The even key and odd key received in the DLAT entries are respective storage protect keys for the first 2K half and last 2K half of the page, when the page is 4K in size. The means for loading the key fields in DLAT 6 is not part of this invention.

A DLAT loading operation occurs whenever the processor transfers an address into LAR 61, and the read controls find that no DLAT entry addresses the page required by the address in LAR 61. The lack of such DLAT entry is indicated by DLAT read controls 8 in FIG. 1 providing a DLAT exception signal on line 87A to translator 7. DLAT read controls 8 simultaneously compare all of the pertinent fields in each of the pair of associative DLAT entries 0, 1 selected by being hash addressed by the DRR. Fields provided for compare operations with corresponding DLAT fields include: the VA bits 8–14 in LAR 61, the STO ID from pointer register 51, and the key field from the program status word (PSW). If equality is found for one of the two DLAT entries 0, 1, respectively being simultaneously compared in the DLAT read controls 8, the read controls select only that DLAT having all pertinent fields equal. The selected DLAT entry then causes controls 8 to output a page frame address (RA) as a signal on line 89A to storage access controls 12 to initiate the access of one or more bytes beginning at that RA address obtained from the selected DLAT entry by cocatenating it with the displacement (D) obtained from LAR 61.

However, the DLAT read controls 8 may note that a common storage indicator valve of 31 exists in the STO ID field of the selected DLAT entry, in which case the DLAT read controls 8 ignore the non-equal compare with the provided STO ID, and the STO ID value 31 in the DLAT entry force an output which acts like an equal STO ID compare for every STO ID valve. Hence, the access of the virtual address in LAR 61 is permitted when the other compares are equal, regardless of which address space (indicated by pointer reg 51) is making the request.

Accordingly, it is thereby realized that the STO ID field in the DLAT is loaded with a value that controls whether the DLAT entry is permitted to be used by only the address space which loaded it, or by all address spaces regardless of which address space loaded it.

The general description of the preferred embodiment is now complete and its components shown in more detail in other figures are next described

SRR Controls 110

Figure 2B:
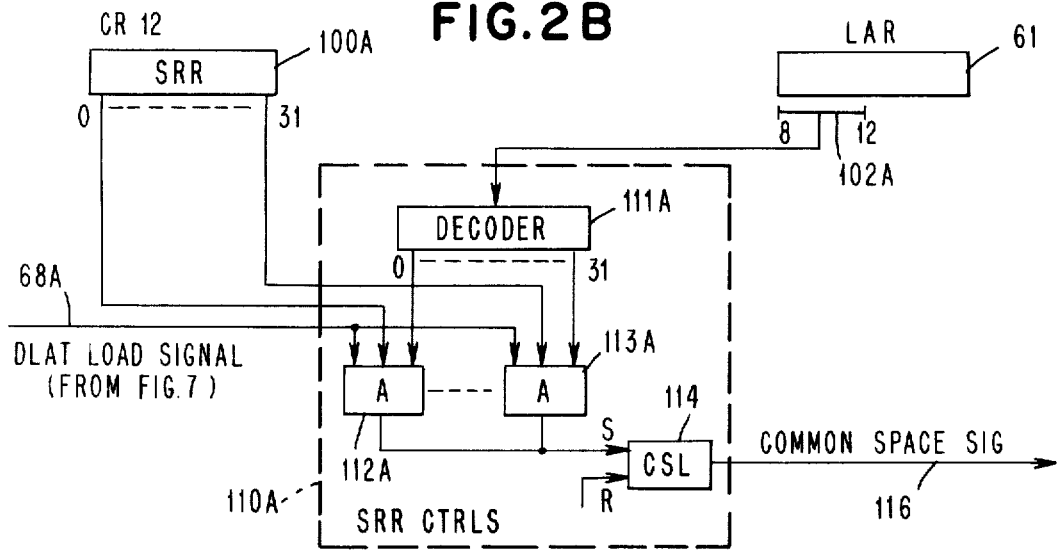

FIGS. 2A and 2B each provide a different embodiment of SRR controls 110 in FIG. 1. The examples in FIGS. 2A and 2B differ by each supporting a different width (i.e. R-7) for outgate 102 for LAR 61. The value of R is 11 in FIG. 2A and 12 in FIG. 2B. The four bit gate 102 in FIG. 2A provides 16 portions (i.e. $2^4$) in each address space, while the five bit gate 102A in FIG. 2B provides 32 portions (i.e. $2^5$). The 24 bit addressing in LAR provides 16 megabyte size address spaces (i.e. $2^{24}$) which therefore are divided into 1 megabyte or 500 kilobyte portions by the SRR controls in FIGS. 2A and 2B, respectively.

Each portion status field in the SRR 10 is indicated by a single bit position. If the bit is set to 1, the corresponding address space portion is common to all address space; but if the status bit is set to 0, the corresponding address space portion is private in every address space in the system.

FIGS. 2A and 2B each have the same basic components (having suffix A in FIG. 2B), in which a control register (CR) 12 contains the SRR. By including the SRR in a control register, the SRR can be loaded and examined by standard instructions provided for loading and examining the control registers in a system. In FIG. 2A, the SRR has 16 portion status bits; and in FIG. 2B the SRR has 32 portion status bits.

Outputs of the status bits in SRR 100, the DLAT load signal, and outgate 102 are connected as inputs of SRR controls 110. Controls 110 include a decoder 111 in FIG. 2A which receives and decodes the four bits from outgate 102 into a selected one of 16 outputs 0–15. A set of 16 AND gates 12 through 13, respectively, are connected to the decoder outputs and to the SRR outputs. The DLAT load signal is provided on line 68A as another input to each of AND gates 112–113.

A common storage latch 114 has a set input which is dot ORed to output of each of the AND gates 112 through 113.

Accordingly, with a given virtual address in LAR 61, decoder 111 will condition one of the AND gates 112–113. A required status bit from register 100 is selected when decoder 111 conditions one of AND gates 112–113, while it is also being conditioned by the DLAT load signal to provide an output to common storage latch 114. If the selected status bit is set to 1, it will set latch 114 which then will provide a common space signal on line 116 to the DLAT load controls 9, which will load common value 31 into the selected DLAT entry. However, if the selected SRR status bit is set to 0, the common storage latch 114 will not be set, and no signal will be provided on the common space signal line 116 to the DLAT load controls 9, which then will load into the selected DLAT entry the requesting STO ID being provided from pointer register 51, instead of the value 31 indicating the common STO ID.

FIGS. 2A and 2B illustrate the variable nature for outgate 102 of LAR 61 in the SRR controls. The number of portions can be increased in powers of 2 by increasing the number of bit positions found in gate 102. This shows the variability of the width of gate 102, which variability is represented by value R in FIG. 1. The upper limit is two portions per address space, one portion shared and one private. The lower limit for the size of a portion is page size, because the DLATs address page units. The number of bits in SRR 100 and the number of AND gates 112—113 must correspondingly be increased. Once a portion size is selected, it will generally remain fixed in a given data processing system.

It can therefore be seen from the examples in FIGS. 2A and 2B that the size of the address space portion can be correspondingly varied from two per address space to page size, in which a portion can have any size that is $2^{24-R}$. The variables will include the width of AND gate 102, the number of status field bits in SRR 100, and the number of AND gates 112-113.

STOK and Controls 5

Figure 3:
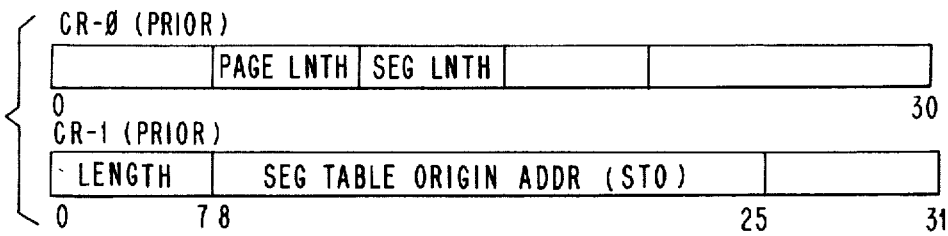
FIG. 3 illustrates prior art formats used by control registers.
Figure 4:
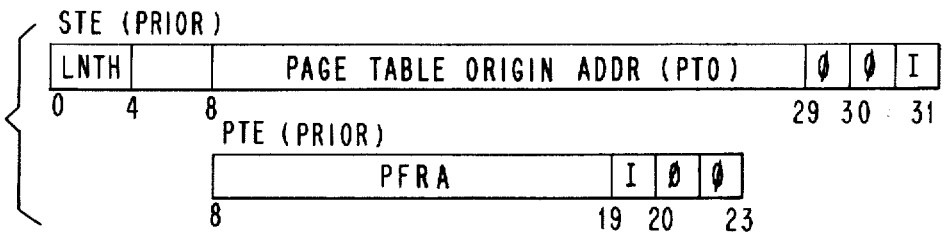
FIG. 4 illustrates prior art formats for segment table entries, and page table entries.
Figure 5:
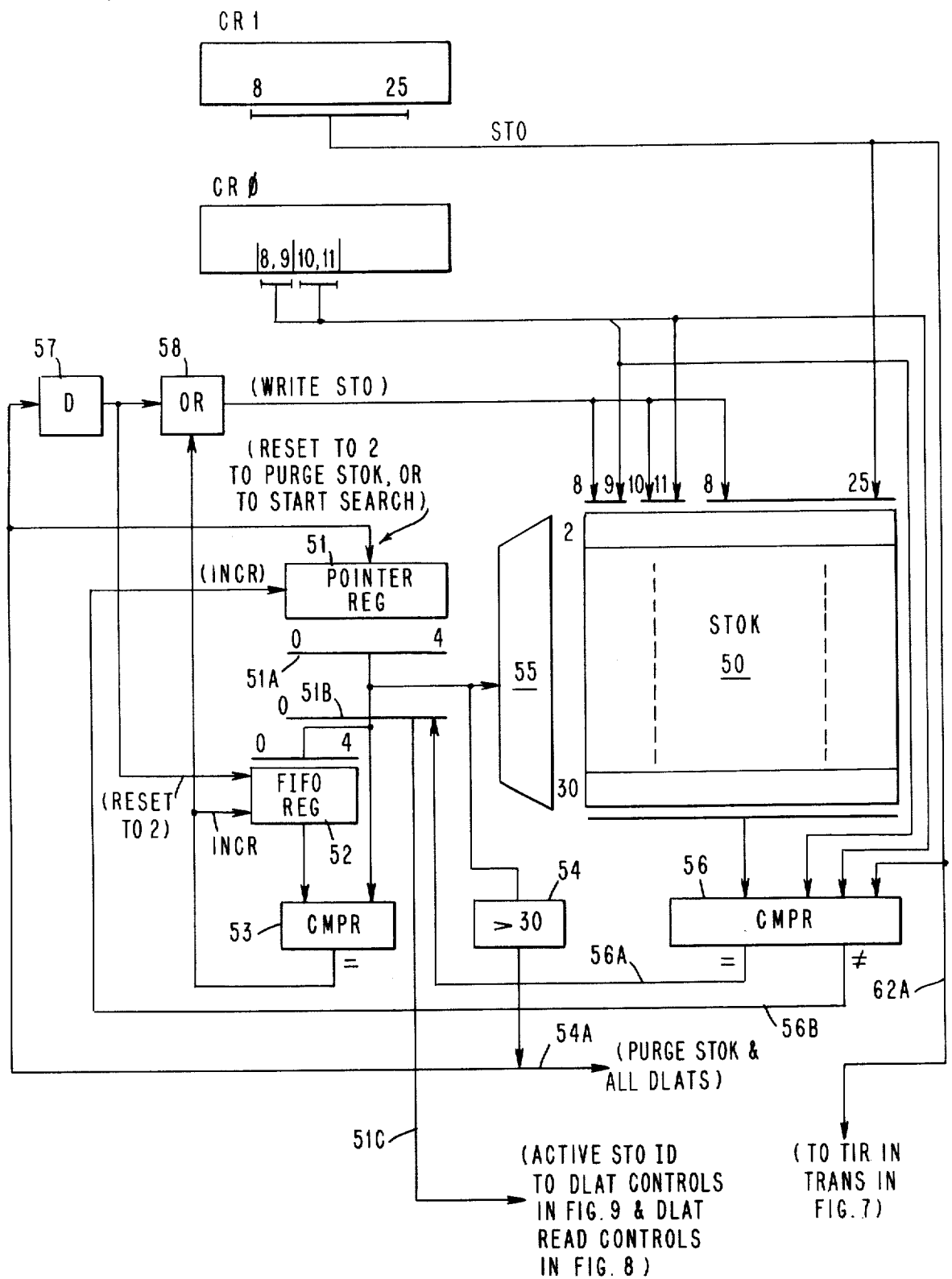
FIG. 5 illustrates in detail a STOK and its controls used in the embodiment to generate address space identifiers (STO IDs).

FIG. 5 illustrates the preferred circuit for the STOK and controls 5. CR0 and CR1 contain the formats illustrated in FIG. 3, in which bits 8–25 of CR1 contain the active STO address, and in CR0 bits 8 and 9 indicate the page size, i.e. a 2K or 4K byte page, and bits 10 and 11 indicate the segment size, i.e. 64K or 1,000K. These CR0 bits are also entered into an entry in STOK 50 when it is loaded.

STOK 50 is permitted by these controls to contain a STO value only once. The valid STO values in STOK 50 are only those STO values contained in entry 2 up to but not included in the entry identified by the current content of a FIFO register 52. All STOK entries from the index in FIFO register 52 through index 30 are considered invalid.

Whenever a new STO value is loaded into CR1, a search is made of STOK 50 to see if that STO currently exists in STOK 50, and if it exists, the index of that entry will be provided in pointer register 51 to then represent the active STO ID on lines 51C. If the search of STOK does not find an entry containing the active STO in CR1, the STO in CR1 is loaded into the STOK entry at the index in FIFO register 52, and the FIFO register is incremented to the next sequential STOK ID value.

A STOK search is done, whenever a new STO value is entered into CR1. The search is started by setting the content of pointer register 51 to STO ID 2, which is the index of the first entry in the STOK. Then the content of entry 2 is read out and compared with the current STO in CR1. If they compare equal, STO entry 2 represents the new STO, and it has STO ID 2. The equal condition is indicated by compare circuit 56 on line 56 A to gate 51B, which thereby gates the content of pointer register 51 out as the active STO ID on lines 51C.

However, if compare circuit 56 outputs an unequal signal on line 56B, it increments the content of pointer register 51 to the next sequential STO ID value, and the comparison of that next entry in STOK 50 is then done in comparator 56 with the STO in CR1. The process then continues until an equal signal is generated, or until the STO in CR1 is loaded into the entry located by FIFO 52.

The STOK search ends whenever comparator 53 finds the pointer reg 51 content equal to the value in FIFO register 52. It is then that the active STO in CR1 is found not to be in any existing entry in STOK 50, and thereby it is then written into the STOK entry at the location currently contained in FIGO register 52, which is then equal to the entry in pointer register 51. The equal output of comparator 53 is also provided through an OR circuit 58, which then provides a write STO signal to the input gates of STOK 50, which thereby writes the active STO values provided by CR0 and 1 into that currently indexed FIFO entry.

The equal signal from comparator 53 also increments FIFO register 52 to the next sequential STO ID value.

Eventually, it is possible for the STOK 50 to have all of its entries 2 through 30 filled with STOs. Then if a new STO value is loaded into CR1, and a search is made in the previously described manner and no equal STO value is found in STOK entries 2–30, pointer register 51 will eventually increment to the value 31 which will be sensed by circuit 54 as greater than 30 which will then output a purge DLAT signal on line 54A which will make all DLAT entries invalid. The output of circuit 54 is also fed back to the reset input of pointer register 51, which resets it to the value 2 for indexing the first entry in STOK 50. Furthermore, the output of circuit 54 is also applied through a delay circuit 57 which in effect provides a delay equal to the time needed to purge all of the DLAT entries, and upon the completion of the DLAT purge, provides an output through OR circuit 58 which writes in the new STO value into STO entry 2.

Translator 7

Figure 7:
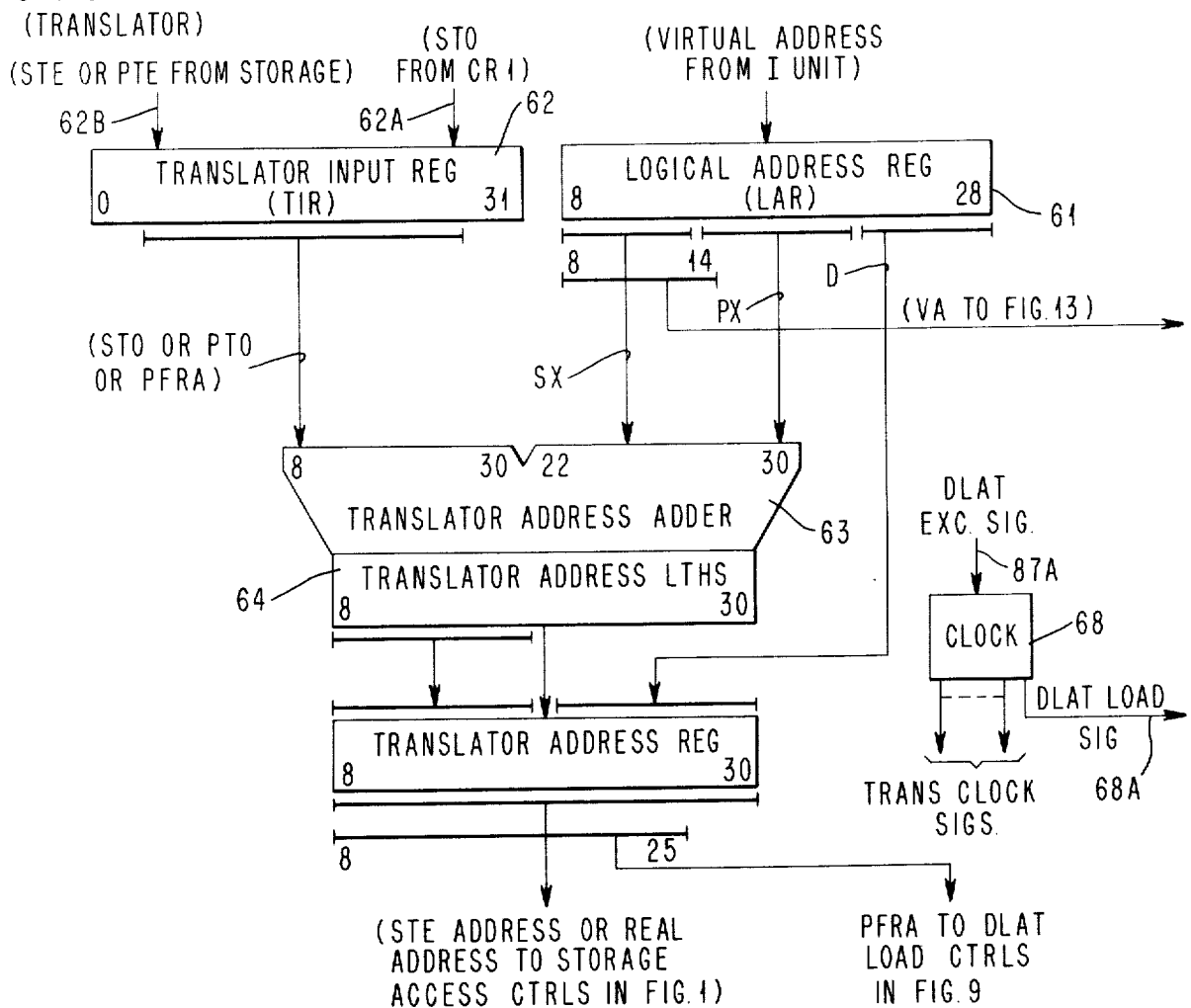
FIG. 7 illustrates details of a translator used in the embodiment.

The translator shown in FIG. 7 is identical to the translator commercially available in the IBM S/370 M168 CPU. The translator inputs comprise logical address register (LAR) 61, which is also represented in FIG. 1, and a translator input register (TIR) 62. LAR 61 receives the virtual addresses from the instruction unit of the processor, and TIR 62 receives the STOs from CR1, and the STEs and PTEs from main storage, one at a time.

The output of translator 7 provides the addresses STO + SX, or PTO + PX, as required to access the STEs and PTEs, respectively. The PFRA + D value is not generated by the translator but is obtained by concatenation of the RA from the selected DLAT and the D value from the LAR 61 which catenation is directly done by the storage access controls 12 in order to obtain faster generation of byte addresses in a page currently available by means of a DLAT entry.

A clock 68 controls the timing involved in the translator circuitry. The clock is actuated by a DLAT exception signal on line 87A from the DLAT read controls 8. When no DLAT entry is found, the clock completes its operation by providing a DLAT load signal on line 68A which signals tht the PFRA has been provided from the PTE and is now available for loading into the selected DLAT entry.

DLAT Load Controls 9

The DLAT load controls in FIG. 9 comprise a plurality of gates which load the various fields in the selected DLAT. Conventional LRU circuits (not shown) select the DLAT to be loaded. In FIG. 9, the common ID generator 31 is an AND gate which receives the common space signal on line 116 and the DLAT load signals on line 68A. When activated, generator 91 provides its output as one bits on five lines to represent the binary value 31. These lines are provided through an OR circuit 96 to the STO ID field in the selected DLAT entry.

Also, line 116 connects the common space signal from the SRR controls to an inverter 97. When the signal is active (i.e. the corresponding SRR status bit is 1), the inverter output disables a STO ID gate 92 to inhibit the active STO ID from being passed from line 51C from the pointer register to OR circuit 96. Therefore, when the common space signal is active, the only output from OR circuit 96 is the value 31 indicating the common ID for the selected DLAT.

If the common space signal is inactive (i.e. the corresponding SRR status bit is 0), there will be no output from generator 91, and inverter 97 will be activating gate 92; in which case the STO ID on lines 51C will be outputted through OR circuit 96 to the five bit STO ID field in the selected DLAT entry.

VA gate 93 will be gating the LAR bits 8–14 on line 61A to the VA field in the selected DLAT to provide the VA identification. Likewise, the RA gate 94 will be passing the PFRA on line 66B of FIG. 7 to the RA field in the selected DLAT.

DLAT Read Controls 8

Figure 8:
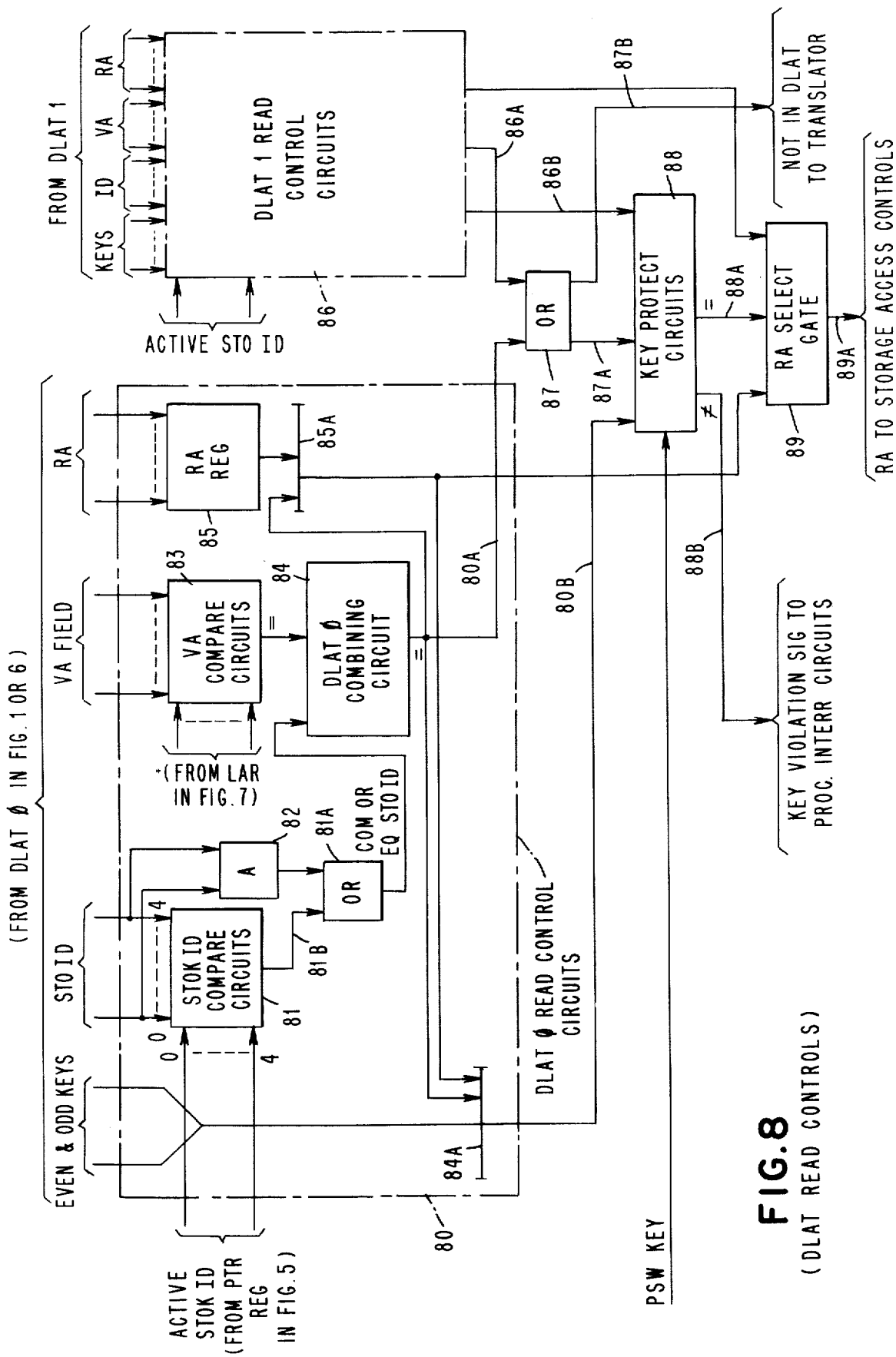
FIG. 8 illustrates details of DLAT read controls used in the embodiment.

The DLAT Read Controls shown in FIG. 8 include two identical DLAT read control circuits 80 and 86, which respectively receive the pair of selected DLAT entries in DLAT tables $\phi$ and 1. Each circuit 80 and 86 includes a plurality of compare circuits. In circuit 80 for example, compare circuit 81 compares the STO ID from the selected DLAT with the active STO ID received from the pointer register 51 to determine if the DLAT address is in the requesting address space. If they are equal, a signal is provided on output line 81B to an OR circuit 81A. If they are unequal, no signal is provided on line 81B, and the DLAT's address is not in the requesting address space. However, this invention provides a common storage detector AND circuit 82 to sense if the STO ID in the selected DLAT is the common storage indicator 31. Circuit 82 is an AND gate which requires that all five STO ID inputs be ones to sense the binary 31 indication and activate the output to OR circuit 81A, which bypasses any unequal condition in circuit 81. Thus, OR circuit 81A provides an active output either if (1) the received STO ID's are equal, or if a common ID indicator is in the DLAT entry.

A VA compare circuit 83 compares the VA fields in the selected DLAT with bit positions 8–14 in LAR 61. If these VA fields compare equal, the DLAT translates that VA, provided that an address space resolution signal is being provided from OR circuit 81A to condition DLAT $\phi$ combining circuit 84, which then provide an output to a gate 85A which thereby passes the absolute address (RA) received from the selected DLAT by an RA register 85. The RA is then passed to RA selected gate 89 from the RA register. The outputs of gate 85A and output 80A of circuit 84 also condition a gate 84A to select the even or odd key from the DLAT entry for being inputted to key protect circuits 88.

DLAT 1 read controls 86 contain identical circuits to the DLAT 0 read controls 80 just described.

The DLAT read controls 80 and 86 (which are simultaneously receiving the outputs of both DLAT's of the pair at a selected hash address) are making the decision of which DLAT entry of the pair, or neither, will be the DLAT selected by the current address request in LAR 61 and pointer register 51. Only one of lines 80A or 86A can be active at any one time from a pair of DLAT entries, since only one of the two circuits can have the compare equal conditions required to make active the respective line. Likewise, only one of the circuits 80 or 86 can output an RA through its gate 85A. The gated RA will be provided as in input to RA select gate 89, but it will not be permitted to exit from gate 89 unless the key in the selected DLAT entry is equal to the PSW key being received by key protect circuit 88. If the PSW key and DLAT key are equal, a signal is provided on line 88A to activate a RA select gate 89 to pass its received RA to the storage access controls, which will access the address in main storage. However, if the key compares unequal in circuits 88, a signal on line 88B indicates a key violation which will be provided to the processor interrupt circuits, and the access will be prevented by gate 89.

OR circuit 87 also has a complementary output 87B which indicates that neither input 80A or 86A is indicating a selection of either DLAT entry 0 or 1, in the pair. The signal on output line 87B generates a DLAT exception signal to indicate that the virtual address in LAR 61 is not represented by any current DLAT entry, and it is necessary for the translator to translate the virtual address into an absolute page address for a page which may be residing in main storage. If the page is not residing in main storage, then I/O activity is needed to transfer the page from an I/O device to main storage before the translator can access it and load a DLAT entry with the address translation.

It will be understood that the common storage indicator used in the DLATs need not be the value 31 but may be any unique indication useable in all DLATs. For example, it may be an extra flag bit in each DLAT set to the state of the portion status bit selected from the SRR.

Although the invention has been shown and described with respect to plural embodiments thereof, it should be understood by those skilled in the art that various changes and omissions in the form and details of the invention may be made therein without departing from the spirit and the scope of the invention, which is to be limited only as set forth in the following claims.

What is claimed is:

1. Synonym prevention control for a translation lookaside buffer (DLAT) in a data processing system, which translates pages for multiple address spaces each address space using the same range of virtual addresses, the address spaces being defined by respective segment tables, a control register identifying an active segment table in a processor of the system, and a virtual address register in the processor for containing a requesting virtual address to be accessed in the address space being defined by the active segment table, comprising a space portion store for recording status fields that divide each address space in the system into corresponding portions, each status field being settable to indicate whether a corresponding address space portion is either private in each address space or common among all address spaces, and means for loading a DLAT entry with a common storage indicator under control of a common setting in a selected space portion status field.

2. A synonym prevention control for a DLAT, as defined in claim 1, in which the status fields each comprise a single bit position in the space portion store.

3. A synonym prevention control for a DLAT, as defined in claim 1, further comprising means for selecting a particular status field in the space portion store under control of the requesting virtual address.

4. A synonym prevention control for a DLAT, as defined in claim 3, further comprising bistable means being set to the state of the particular status field, and an output of the bistable means being connected to the loading means.

5. A synonym prevention control for a DLAT, as defined in claim 1, further comprising a system control register containing the space portion store.

6. Synonym prevention control for a translation lookaside buffer (DLAT) in a data processing system, which addresses pages for multiple address spaces, each address space using the same virtual addresses, the address spaces being defined by respective segment tables, a control register identifying an active segment table in a processor of the system, and a virtual address register in the processor for containing a requesting virtual address to be accessed in the address space defined by the active segment table, comprising a space portion store for recording status fields that divide each of the address spaces in the system into corresponding portions, each status field being settabe to indicate whether a corresponding address space portion is either private in each address space or shareable among all address spaces, the DLAT having a plurality of DLAT entries, each DLAT entry having fields for containing a virtual and a real address for a translated page, and also having a field for identifying an address space associated with the translated page in the DLAT entry address translation means being actuated by a DLAT exception signal indicating no DLAT entry is found to contain a translation of a page containing the requesting virtual address, DLAT loading means for loading the fields in a DLAT entry selected in response to no DLAT entry containing the translation of the page containing the requested address, space portion selection means associated with and activated by the address translation means for selecting a status field in the space portion store by means of a high order part of the requesting virtual address in the virtual address register to signal whether a corresponding address space portion has shareable or private status, means for transferring a common portion identifier into the selected DLAT entry in response to a signal from the space portion selection means indicating a shareable status, and means for transmitting an address space identifier to the selected DLAT entry in response to the signal from the space portion selection means indicating a private status, whereby the common portion identifier in any DLAT entry indicates that the translated page loaded into the DLAT entry is to be shared among the address spaces, and whereby a valid address space identifier in any DLAT entry indicates that the translated page is to be restricted to the private address space identified in the DLAT.

7. Synonym prevention control for a translation lookaside buffer (DLAT) in a data processing system, which addresses pages for multiple address spaces, each address space using the same virtual addresses, the address spaces being defined by respective segment tables, a control register identifying an active segment table in a processor of the system, and a virtual address register in the processor for containing a requesting virtual address to be accessed in the address space defined by the active segment table, comprising
- a space portion store for recording status fields that divide each of the address spaces in the system into corresponding portions, each status field being settable to indicate whether a corresponding address space portion is either private in each address space or sharable among all address spaces,
- the DLAT having a plurality of DLAT entries, each DLAT entry having fields for containing a virtual and a real address indicator for a translated page, and also having a field for identifying an address space associated with the translated page in the DLAT entry,
- DLAT selection means for receiving a part of a virtual address in the virtual address register to select a subset of the DLAT entries in the array, each subset having at least one DLAT entry, DLAT reading means for selecting not more than one DLAT entry of a selected subset,
- address translation means being actuated when no DLAT entry is selected by the DLAT reading means for loading a DLAT entry in the selected subset,
- space portion selection means associated with and activated by the address translation means for selecting a status field in the space portion store by means of a high order part of the requesting virtual address in the virtual address register to signal whether a corresponding address space portion has sharable or private status,
- means for transferring a common portion identifier into the selected DLAT entry in response to a signal from the space portion selection means indicating a sharable status, and
- means for transmitting an address space identifier to the selected DLAT entry in response to the signal from the space portion selection means indicating a private status,
- whereby the common portion identifier in any DLAT entry indicates that the translated page loaded into the DLAT entry is to be shared among the address spaces, and whereby a valid address space identifier in any DLAT entry indicates that the translated page is to be restricted to the private address space identified in the DLAT.

8. Synonym prevention control for a DLAT as defined in claim 7, in which the DLAT reading means further comprises
- virtual address comparing means for comparing the virtual address indicator received by the DLAT reading means with the virtual address received from the virtual address register to generate a VA compare signal,
- address space comparing means for comparing an address space identifier received by the DLAT reading means with the active address space identifier provided by a segment table control means register to provide an address control signal,
- share signal means for sensing and outputting the state of a common space identifier signal received by the DLAT reading means,
- real address transfer means connected to an output of the share signal means and to the address control signal from the address space comparing means for controlling the transfer of the page frame address from the DLAT reading means,
- whereby the share signal means can enable the real address transfer means to control whether the page frame address in the addressed DLAT can be accessed only by a segment table identified in the addressed DLAT, or by any segment table by disregarding the compare output of the address space comparing means.

9. Synonym prevention control for a DLAT as defined in claim 7, in which the space portion store further comprises
- a synonym resolution register having a plurality of space portion status fields, each field being associated with a corresponding portion in each address space in the system,
- means for decoding a plurality of high-order bits from a requesting virtual address to select a required status field output from the synonym resolution register,
- and means connecting the DLAT loading means to the transferring means and the transmitting means to control the loading into the selected DLAT entry of an indicator for a private space or a common space.

10. Synonym prevention control for a DLAT as defined in claim 9, in which the connecting means further comprises
- a plurality of AND gates having inputs respectively connected to outputs of the space portion store and to outputs of the decoding means,
- means actuating the AND gates upon actuation of the address translation means, and
- bistable means for signalling the common or private state of an address space portion containing the request to be accessed in main storage,
- means connecting the outputs of the AND gates to an input of the bistable means to control the signalling of the common or private state, and
- means connecting an output of the bistable means to the transferring means and transmitting means for loading a DLAT entry with a common or private indication.

* * * * *